Jan. 1, 1952 E. ORSHANSKY, JR., ET AL 2,580,946
DRIVING MECHANISM AND CONTROL SYSTEM THEREFOR
Filed Jan. 4, 1947 5 Sheets-Sheet 1

INVENTORS
Elias Orshansky, Jr.
Tilden W. Southack
Benjamin Kahn
BY
ATTORNEYS

Jan. 1, 1952         E. ORSHANSKY, JR., ET AL         2,580,946
         DRIVING MECHANISM AND CONTROL SYSTEM THEREFOR
Filed Jan. 4, 1947                                  5 Sheets-Sheet 2
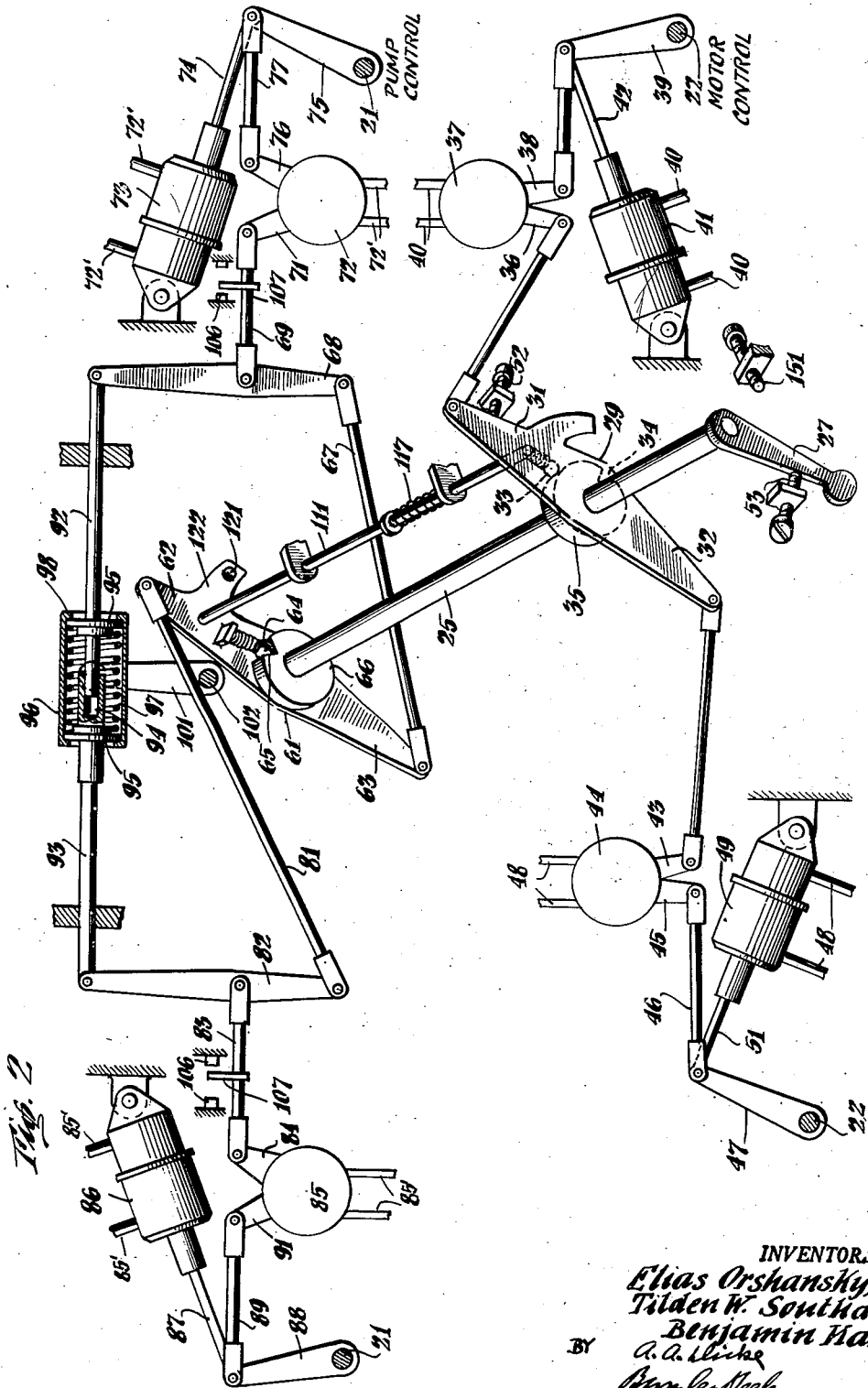
INVENTORS
Elias Orshansky, Jr.
Tilden W. Southack
Benjamin Hahn
BY
ATTORNEYS

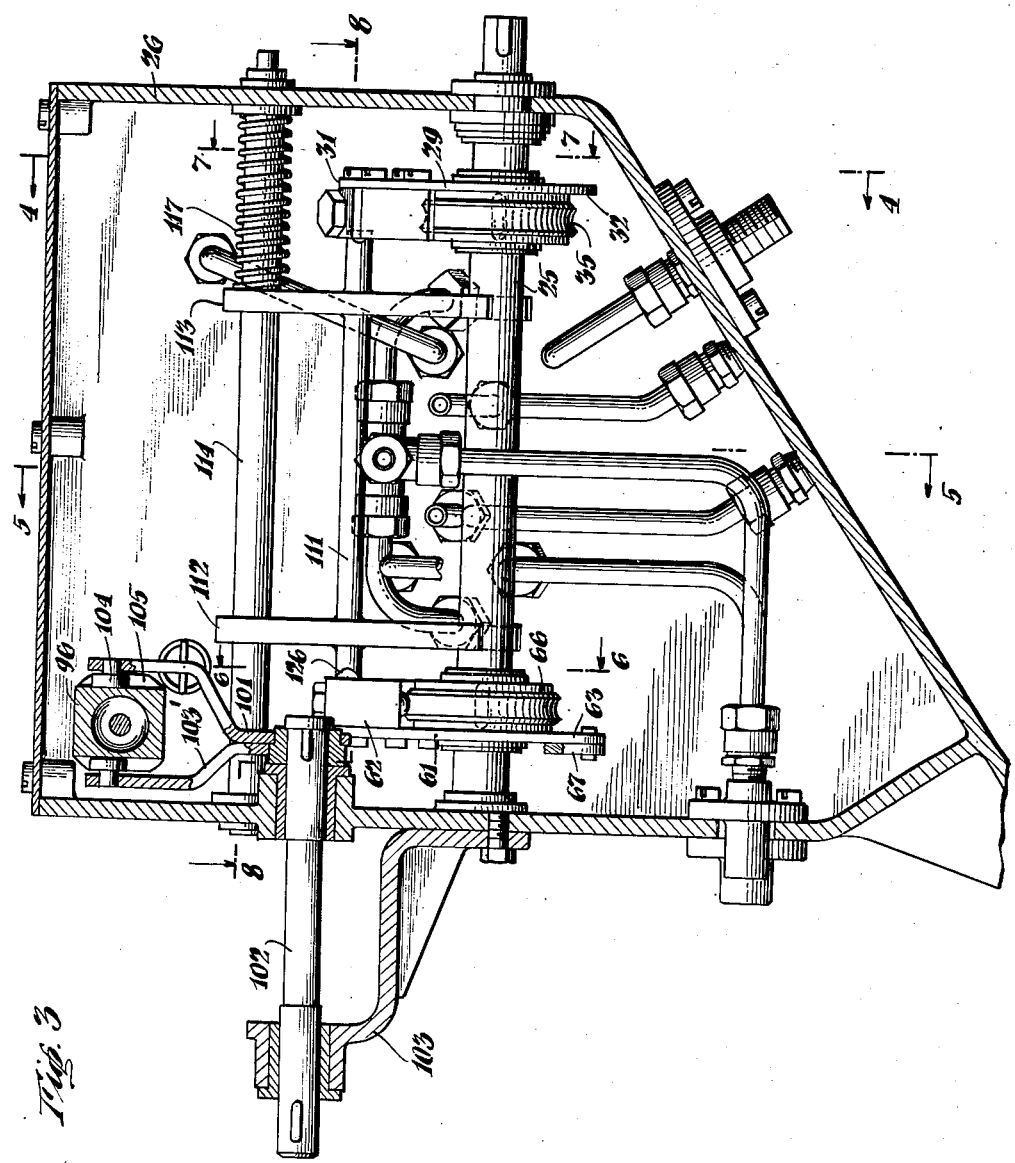

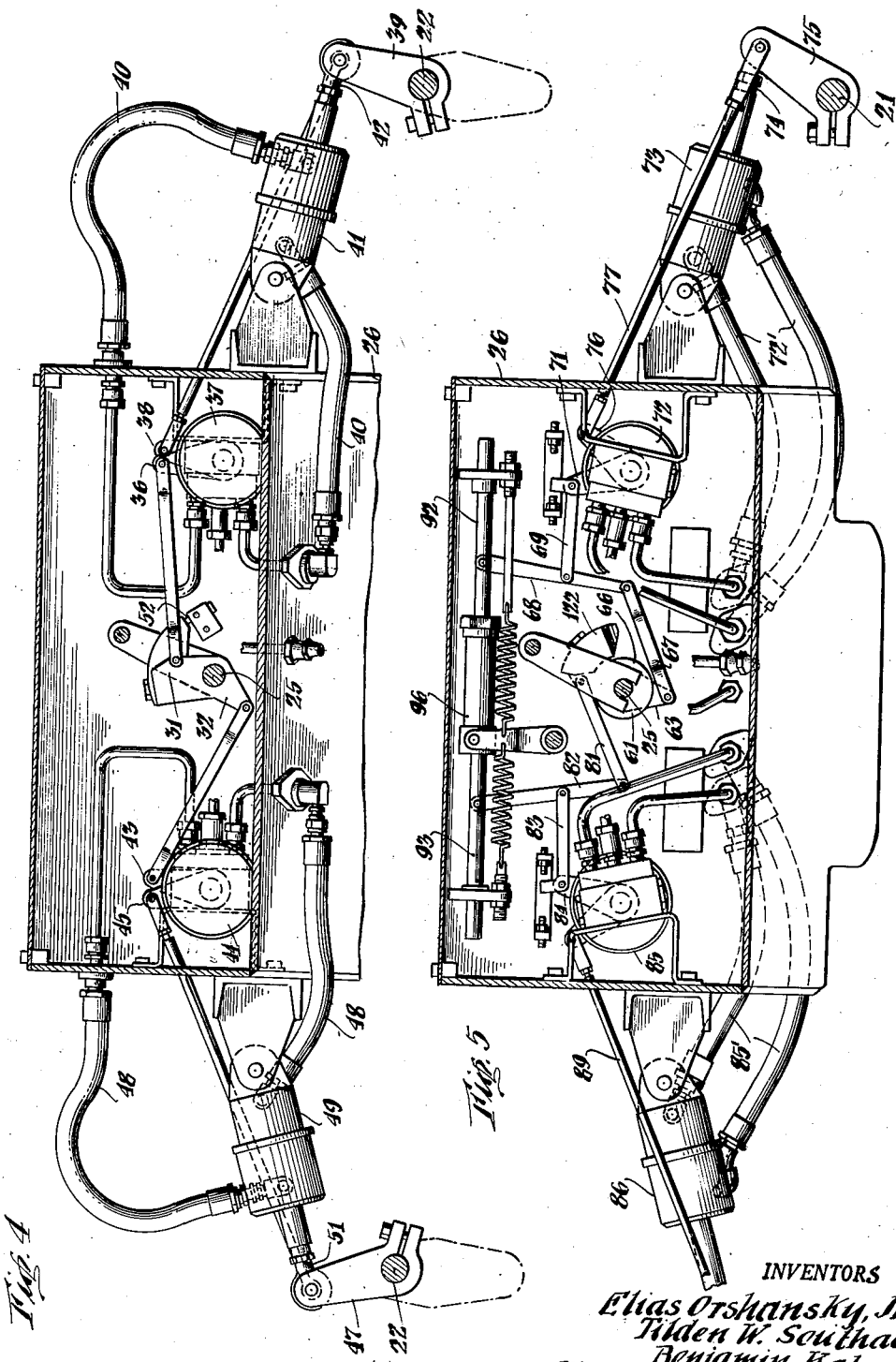

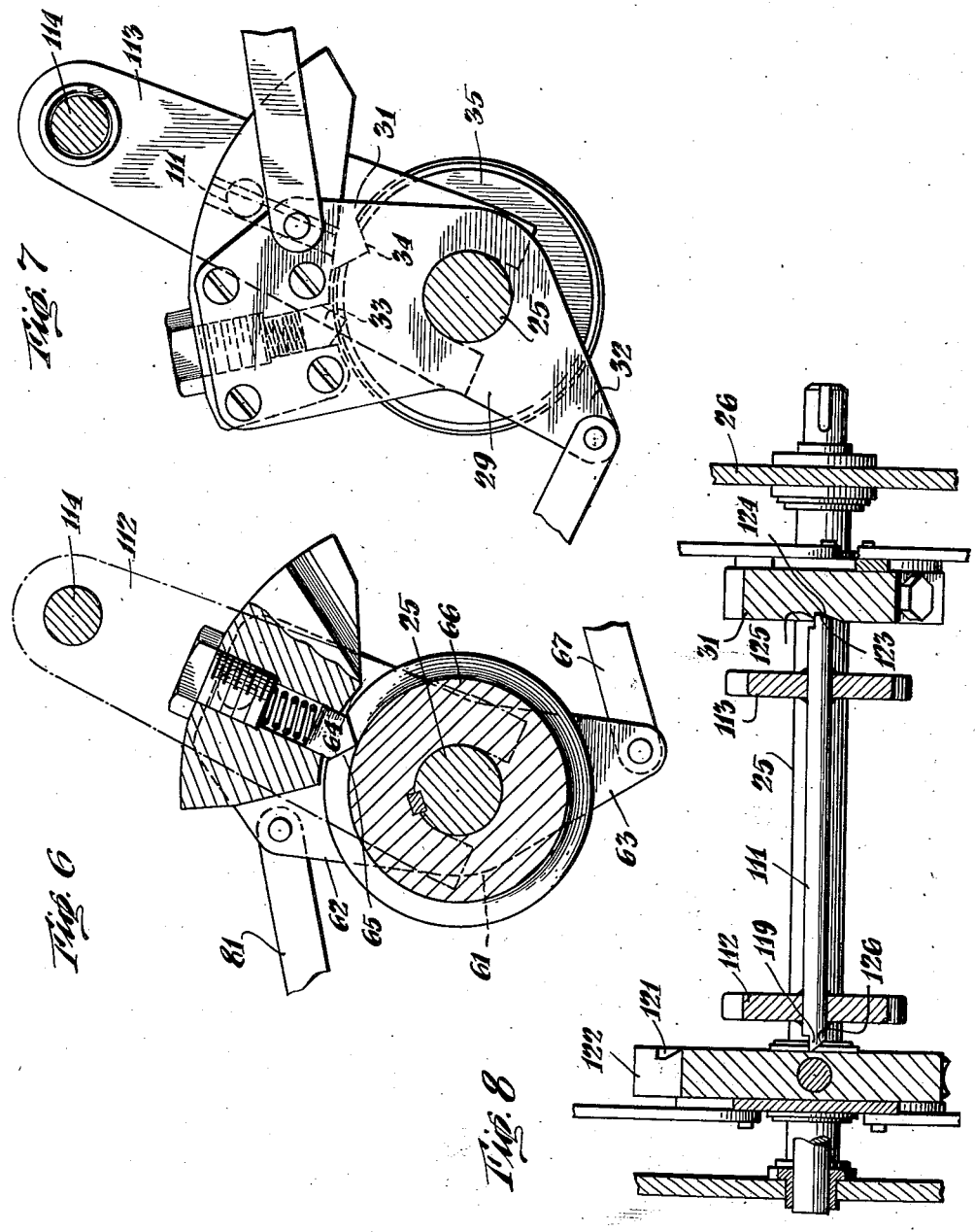

Patented Jan. 1, 1952

2,580,946

UNITED STATES PATENT OFFICE 2,580,946

DRIVING MECHANISM AND CONTROL SYSTEM THEREFOR

Elias Orshansky, Jr., and Tilden W. Southack, Stamford, Conn., and Benjamin Kahn, New York, N. Y., assignors to The Acrotorque Company, Stamford, Conn., a corporation of Connecticut Application January 4, 1947, Serial No. 720,290

18 Claims. (Cl. 74—687)

This invention relates to driving mechanisms and control systems therefor and particularly to plural driving mechanisms and their controls as employed in various types of land, water and amphibious vehicles.

An object is to provide an improved control system for use in coordinating and proportioning the operating characteristics of plural mechanisms employed in producing a single integrated mechanical result. A well known use for such a system, and one to which the present invention is particularly adaptable, is in varying and proportioning the transmission of power to a plurality of associated mechanisms, such, for example, as the separate tracks of a tractor type drive.

A further object of this invention is to provide an improved arrangement of driving mechanism for vehicles employing plural drives and transmissions.

A still further object is to provide an improved control system for twin drive vehicles employing plural hydraulic transmissions, constructed and arranged to give both speed and steering control with a greatly increased smoothness of operation.

A still further object is to provide an improved control system for a hydraulic transmission having separate pump and motor control members, constructed and arranged to insure the different control members being operated in the required sequence.

These and other objects, which will be apparent, are accomplished by the invention hereinafter described, and illustrated in the accompanying drawing, in which:

Fig. 2 is a diagrammatic lay out illustrating the details of the dual-drive control mechanism shown in Fig. 1;

Fig. 3 is a view in elevation of certain parts shown in Fig. 2, the casing being shown in vertical section;

Figure 1:
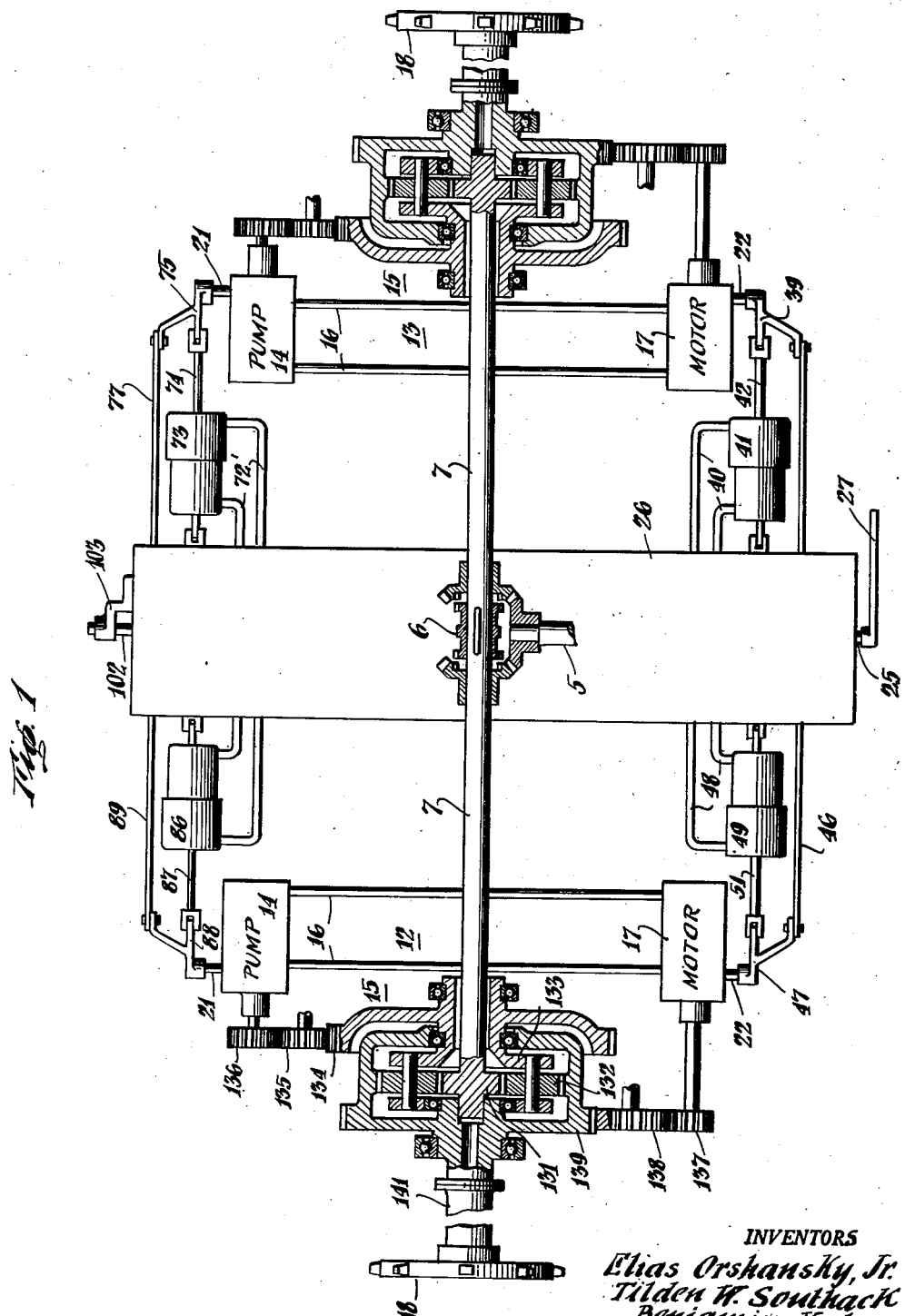
Fig. 1 is a diagram illustrating dual driving mechanisms and a control system arranged in accordance with one embodiment of the invention.

Figs. 4 and 5 are vertical sections of the control system taken on the lines 4—4 and 5—5, respectively, of Fig. 3, and Figs. 6, 7 and 8 are partial sectional views of certain details taken on lines 6—6, 7—7 and 8—8, respectively, of Fig. 3.

The present invention as illustrated comprises twin driving mechanisms, usually operated from a single prime mover, each consisting of a planetary gearing combined with a hydraulic transmission unit, each hydraulic transmission unit consisting of a hydraulic pump and a hydraulic motor of the positive displacement type. Each pump is connected for rotation with an intermediate element of the planetary gearing and each motor is connected to the output drive shaft. The speed of each drive shaft relative to the prime mover is regulated by controlling the relative speeds of operation of the pump and motor in the transmission unit for that shaft. The relative speed of each pump and motor is regulated by varying the piston stroke thereof by any suitable mechanism such, for example, as that shown in the prior patent to Orshansky, 2,256,324, September 16, 1941. For this purpose each motor and pump has a volume regulating shaft, or other member, the position of which is regulated by the present control system. At idling speed, the piston stroke of the pump is at zero, while that of the associated motor is at maximum. In going from zero to maximum transmission speed, the piston stroke of the pump is first gradually increased to maximum, thus gradually increasing the flow of motivating fluid through the associated motor. After the pump stroke is at maximum, the speed ratio of the transmission is further increased by a gradual reduction in the piston stroke of the motor resulting in corresponding increase in relative motor speed, up to maximum. The speed ratio of the transmission is reduced by reversing the sequence of operations.

In the illustrated embodiment of the invention, each driving mechanism comprises a combined hydro-mechanical planetary gear system, as hereafter described.

In the present invention, in which there are dual hydraulic transmissions, each including a separate pump and motor, a control system is provided which simultaneously increases the piston strokes of each pump up to maximum and then simultaneously decreases the piston stroke of each motor to a minimum, and reduces the transmission speed ratios by a reverse sequence. At the same time, the system provides for proportioning the transmission speed ratios, when desired for steering or other purposes, by varying the relative piston strokes of the pumps, thus changing the relative speed ratios of the two transmissions.

As illustrated, the invention is shown in connection with a tractor type drive having a power shaft 5 operated by a prime mover (not shown) connected through reversing gearing 6 with a drive shaft 7 for simultaneously operating separate driving mechanisms, each including hydraulic transmission units 12 and 13. Each hydraulic transmission includes a pump 14 driven through planetary gearing 15 by the prime mover and connected by a closed hydraulic system 16 with an associated hydraulic motor 17 operated by the pump and connected to a track driving sprocket 18 or other propelling means, through the planetary gearing 15 in the manner hereafter described. The volume of each pump is separately controlled through a regulating shaft 21 (Figs. 1, 2 and 5), operation of which changes the piston stroke of the associated pump, and the volume of each motor is separately controlled through a regulating shaft 22, operation of which changes the piston stroke of the associated motor. In accordance with the present invention, a control system 23 is directly connected to each pump and motor control member 22 for regulating the volumes thereof in the above described manner and thus regulating the speed of the associated vehicle relative to the prime mover, as well as controlling the steering thereof.

As illustrated in Figs. 2, 3 and 4, the control system comprises a control shaft 25 rotatably mounted in a casing 26 and adapted to be rotated by a speed ratio control lever 27, which is diagrammatically shown in Figs. 1 and 2, attached directly to the speed control shaft, but which obviously can be located at any suitable point of control and connected to the shaft in any suitable way.

A crank 29 having oppositely projecting crank arms 31 and 32 is rotatably mounted on the shaft 25 and is adapted to be yieldingly connected thereto for rotation therewith by a spring pressed detent 33 (Fig. 7) mounted on the crank and adapted to engage a recess 34 in a collar 35 secured to the shaft. One arm 31 of the crank is linked to the control lever 36 of a pressure-controlling, radial type follow up valve 37, the cut-off lever 38 of which is linked to the end of a crank 39 secured to the speed control shaft 22 of one of the hydraulic motors 17. The follow up valve 37 controls the delivery of fluid pressure to a servo cylinder 41, the pitson of the cylinder 41 being connected by a rod 42 with the crank 39.

The construction and operation of the follow up valve 37 is well known in the art. It controls the delivery of fluid pressure to the opposite ends of the servo cylinder 41, through fluid pressure connections 40, and regulates the position of the piston therein and, hence, of the crank arm 39 and motor control shaft 22, in accordance with the position of the crank arm 31 on the control shaft 25. As is well known, construction of the follow up valve 37 is such that movement of the control lever 36 results in delivery of pressure to the servo cylinder 41 so as to move the piston therein, in a direction corresponding to the direction of movement of the control lever, sufficiently to result in a corresponding movement of the cut-off lever 38, until the piston is moved sufficiently far to shift the lever 38 a distance equal to the distance which has been imparted to the control lever 36. This again closes the valve 37 so that further delivery to the cylinder is cut off and the parts are held in the new position until the control lever 36 is again shifted. The operation is such that the pressure to the servo cylinder 41 is cut off when the two levers 36 and 38 assume symmetrical positions with relation to a central radial plane between them. If, for example, the control lever 36 is moved away from the cut-off lever 38, pressure is delivered to the servo cylinder so as to move the piston therein, and the associated speed control shaft 22 in a direction to shift the cut-off lever 38 away from the control lever 36 a distance equal to the distance through which the control lever 36 has been moved. This movement of the cut-off lever 38 then serves to cut off the delivery of further pressure to the servo cylinder. Likewise, movement of the control lever 36 toward the cut-off lever 38 causes the servo cylinder in turn to shift the cut-off lever 38 toward the control lever 36 a distance equal to the distance through which the latter has been moved. As a result movement of the crank arm 31 results in movement of the speed control crank 39 and the motor speed control shaft 22 in exact accordance therewith.

A crank arm 32 is similarly linked to the control lever 43 of a follow up valve 44, having a cut-off lever 45 connected by link 46 to the speed control crank 47 on the speed control shaft 22 of the other motor 17. The follow up valve 44 controls the delivery of pressure through fluid pressure connections 48 to a servo cylinder 49 having a piston connected by piston rod 51 with the crank 47.

Rotation of the motor volume control shafts 22 regulates the piston strokes of the associated motors through the mechanism and in the manner described, for example, in the above mentioned patent, the details of which need not be herein described. In this way rotation of the crank member 29 by the control shaft 25 varies the volumes of the two motors 17 through variation in their piston strokes. The position of the crank member 29 providing maximum piston stroke, is fixed by an adjustable stop 52 and the idling position for the speed control lever 27 is determined by an adjustable stop 53.

A second crank 61 having oppositely extending crank arms 62 and 63 is also rotatably supported on the control shaft 25 to which it is adapted to be yieldingly connected by a spring pressed detent 64 mounted on the arm for engaging a recess 65 in a collar 66 secured to the shaft (Fig. 6). A link 67 connects the crank arm 63 with one end of a floating lever 68 of whiffle-tree type connected intermediate its ends by a link 69 to the control lever 71 of a follow up valve 72 controlling through pressure connections 72', the operation of a servo cylinder 73 having a piston connected by a rod 74 with a crank arm 75 secured to the volume control shaft 21 of one of the transmission pumps 14. The cut-off lever 76 of the follow up valve 72 is also connected to the crank 75 by link 77. A link 81 connects the opposite crank arm 62 with one end of a floating or whiffle-tree type lever 82 connected intermediate its end by a link 83 to the control lever 84 of a follow up valve 85 controlling through pressure connections 85', the delivery of pressure to a servo cylinder 86 having a piston connected by rod 87 to a crank arm 88 mounted on the volume control shaft 21 of the other transmission pump 14. A link 89 connects the crank 88 with the cut-off lever 91 of the follow up valve 85.

The opposite ends of the floating levers 68 and 82 are connected to rods 92 and 93, respectively, having their ends telescoped together by sliding joint 94 permitting relative movement between the rods, as shown in Fig. 2. Each rod has a collar 95 mounted within a sleeve 96. A spring 97 interposed between the collars tends to yieldingly force the rods apart sufficiently for the collars to engage the interned ends 98 of the enclosing sleeve, as shown in Fig. 2. A steering crank 101 secured to shaft 102 having one end rotatably mounted in one wall of the casing 26, see Fig. 2 and 3, and the opposite end supported in a bracket 103, is connected to the sleeve 96. In Fig. 3, the crank 101 is shown as having U-shaped arms 103' connected to opposite sides of the sleeve 96 by tenons 104 engaging in vertically extending slots 105 formed on opposite sides of the sleeve member.

The amount of movement that can be imparted to the pump volume control shafts 21 is determined by fixed stops 106, see Fig. 2, cooperating with lugs 107 on the links 69 and 83, which connect the two floating levers with the associated follow up valves.

By the arrangement described, it will be apparent that the delivery rate of pumps 14 will be simultaneously increased or decreased by operation of the speed ratio control shaft 25, which simultaneously moves the floating levers 68 and 82 outwardly to the same extent. On the other hand, the volume of the two pumps can be proportioned relatively to each other by rotation of the steering shaft 102 and lever 101, which shifts the floating levers 68 and 82, one outwardly and the other inwardly, to increase the volume of one pump and simultaneously decrease the volume of the other pump. This, of course, results in changing the proportionate speed ratios of the respective hydraulic transmissions, in turn changing the proportionate speeds of the associated driving mechanisms and steering the associated vehicle.

When idling, the strokes of the pump pistons in each transmission are at zero. To increase the speed ratios of the respective transmissions, the piston strokes of the pumps are first increased by the present control system, after which the strokes of the motor pistons are decreased. In order to insure the necessary sequence of operations, a mechanism is provided for so controlling the cranks 29 and 61 on the speed ratio control shaft 25 that such cranks are actuated in sequence only and never simultaneously.

As illustrated, this mechanism comprises an interlocking rod 111 (see Figs. 2, 3, 6, 7 and 8) mounted for longitudinal movement between the cranks 29 and 61 and of such length that one crank only is engaged by the rod at a given time.

The rod is secured to and extends between spaced hangers 112, 113, slidably hung on a shaft 114 supported in the casing 26. The lower end of each hanger is grooved to straddle the speed control shaft 25 as best shown in Figs. 3, 6 and 7. A helical spring 117 surrounds the shaft 114 between one wall of the casing 26 and the hanger 113 so as to bias the interlock rod 111 toward the arm 62 of the crank 61.

As shown in Figs. 3 and 8, the interlock rod 111 has a tooth 119 adapted to engage in a recess 121 provided in a quadrant 122 formed on the crank arm 62. The opposite end of the rod 111 has a tooth 123 adapted to engage in a recess 124 formed in the crank arm 31. As shown in Fig. 8, each tooth has an axial face 125, which engages an axial wall of the associated recess and when so engaged locks the associated crank arm against further movement in one direction. At the same time, each interlock rod has a beveled edge 126 which permits the associated crank arm to move in the opposite direction, simultaneously forcing the associated rod tooth out of the recess 121 because of the inclined face 126.

As illustrated, the present invention is shown in connection with a combination hydro-mechanical drive for transmitting power from the prime mover shaft 5 to the driving sprockets 18. It is best shown in Fig. 1.

As the two planetary gear trains associated with each hydraulic transmission are identical in construction, the description of one will suffice.

The driving shaft 7 drives sun gear 131, which drives a set of planetary pinions 132 rotatably supported in a cage 133, which is itself rotatably mounted. The cage has a gear 134 geared through an idler 135 with pump gear 136 for operating the associated pump 14 of the left hand hydraulic transmission unit. The hydraulic circuit 16 connects the pump 14 of this unit with the motor 17 of such unit. The motor shaft has a pinion 137 geared through idler 138 to ring gear 139 on the planetary housing which is formed with an internal gear meshing with the planetary pinions 132 and directly connected to the driven shaft 141.

Referring to a single hydraulic transmission unit, for example, at idling speed the piston stroke of the pump 14 is at zero while the piston stroke of the associated motor 17 is at maximum. Under these conditions rotation of the pump shaft by the pinion 133, which is in turn driven from the driving shaft 7 through the planetary pinions 132 and cage 133, produces no effect upon the hydraulic transmission, the pump shaft rotating without reciprocating the pump pistons. Therefore, no fluid can pass through its associated motor 17 which is therefore held against rotation as its pistons cannot reciprocate. As the stroke of the pump pistons is gradually increased, however, through operation of the associated pump control shafts 21, more and more fluid is transmitted to the associated motor 17 through the hydraulic circuit 16 with the result that the motor begins to turn and gradually increases in speed as the stroke of the pump pistons is increased until the pump is finally operating at full stroke. With the pump remaining at full stroke, the stroke of the motor pistons is then gradually reduced causing the motor 17 to gradually increase its speed and the speed of the pinion 137, as will be fully described hereinafter.

As the motor begins to rotate, the planetary housing begins to rotate carrying with it the driven shaft 141 and the associated driving mechanism. Therefore, increase in motor speed gradually results in a corresponding increase in the speed of the driven shaft 141. When the motor stroke has been reduced to zero, the motor can consume no more fluid, thus producing a hydraulic lock in the hydraulic pressure circuit and the pump is thereby stopped from further rotation. Under these conditions, the cage 133 is held against rotation and the full power is then transmitted through the planetary gears direct from the driving shaft 7 to the driven shaft 141. The piston stroke of the motor being zero at this point, the motor pinion 137 and associated shaft merely rotate in a free manner. In bringing a transmission from full speed to neutral, the above described sequence is reversed.

Therefore, it will be seen that shifting from idling to maximum speed ratio requires a certain sequence of operations between the pump and motor of each hydraulic transmission unit. First, the piston stroke of the pumps is increased from zero to maximum and this is followed by decreasing the piston stroke of the motors from maximum to zero. The reverse sequence is gone through in going from high speed ratio to idle.

The control system herein described is such as to insure the proper sequence of operations between the pump and motor of each hydraulic transmission for increase or decrease in speed ratio, and also provides a speed proportioning control between the pumps of the two hydraulic transmissions for steering purposes. In this connection, it will be apparent that the steering lever 101 of the control system can be operated from any suitable steering control, such as, a conventional steering wheel and column, and the speed control lever 27 can be located on the steering column itself within easy reach of the driver.

In starting from idling, in which position the speed ratio control lever 27 engages the stop 53, and the crank arm 31 engages the stop 52, it will be seen from Fig. 2 that the detent 64 on the crank 61 is engaged in the recess 65 in the associated control shaft collar 66, and that the detent 33 on the crank 29 is out of engagement with the recess 34 in its associated shaft collar 35 and is riding on the periphery or detent race of such collar. The toothed end of the interlock rod 111 is in the position shown in Fig. 8, in which one tooth 123 engages in the recess 124 in the crank arm 31 so as to prevent movement thereof during the first part of the rotation of shaft 25. The opposite tooth 119 simply slides across the surface of the quadrant 122 and the length of the rod is such that when the tooth 119 engages the quadrant surface, the opposite tooth 123 is positively held interlocked with the crank arm 31. As the speed control lever 27 is moved to rotate the speed control shaft 25 counter-clockwise (Fig. 2), the crank arms 62 and 63 are similarly rotated, thus operating the associated follow up valves 72 and 85 simultaneously so as to move both pump volume control shafts 21 equally and correspondingly increase the speed ratio of each hydraulic transmission. This continues until the crank arm 62 is moved sufficiently for the interlock rod tooth 119 to engage the recess 121 in the quadrant 122, under impulse of the helical spring 117. This locks the crank 61 and crank arm 62, 63 against further movement. At this point, the piston stroke of each pump has been increased to maximum. Shifting the interlock rod 111 into engagement with the recess 121 by the spring 117 simultaneously withdraws the opposite tooth 123 from the recess 124 in the crank arm 31. At this point, the speed control shaft 25 has rotated to the point where the detent 33 engages the recess 34 in the collar 35, thus yieldingly locking the crank arms 31, 32 to the shaft 25. Consequently, further rotation of the speed control shaft moves the detent 64 out of the recess 65, the crank 61 being locked against further movement in that direction, and begins to move the crank arms 31, 32. This simultaneously actuates the follow up valves 37, 44 and in turn operates the motor volume shafts 22 to decrease the motor volume to a minimum. Maximum speed ratio is attained when the speed control lever 27 engages a stop 151. In decreasing the speed ratio, the shaft 25 is turned clockwise (Fig. 2) and the crank arms 31, 32 are first returned to their starting position, thus increasing the stroke of each motor to maximum. At this point, the detent 64, which has been riding on the race of the collar 66, engages the recess 65. Upon further clockwise movement of the speed ratio shaft 25, the detent 33 on the crank 29 moves out of the recess 34 onto the periphery of the collar 35, thus releasing the crank 29 from its engagement with the shaft 25. Thereupon the opposite crank 61 is caused to rotate by the engagement of its detent 64, which is pressed into the associated recess with sufficient force to move the crank arm 62 against the tapered edge 126 of the interlock rod 111. This shifts the rod 111 toward the crank arm 31 into engagement with the recess 124 therein, thus locking the motor control crank against further movement, while permitting the pump control crank 62 to rotate under the continued clockwise movement of the speed ratio control shaft 25 until the pump stroke has been reduced to zero and the transmission is again in idling condition.

In any position of the control shaft 25 and motor control links, the proportionate speed ratios of the two transmissions can be varied for steering purposes by moving the steering crank 101 in one direction or the other. This results in operating the respective follow up valves 72, 75 in opposite directions with the result that the drive ratio of one transmission is decreased, while the other is increased to produce the desired steering effect.

By virtue of the fact that the steering mechanism and the ratio control are interconnected, as the forward speed increases a greater turn of the steering wheel will be required to obtain a given radius of turn of the vehicle.

Although one embodiment of the invention has been set forth in specific detail, it will be apparent that the invention can be variously modified and adapted within the scope of the appended claims.

We claim:

1. A control system for track type drives employing a separate transmission for each track, each transmission including variable volume hydraulic pump and motor units and a separate volume control member associated with each pump unit and each motor unit, comprising in combination a volume control mechanism connected to each pump and motor control member so as to first increase said pump volume from low to maximum and then decrease said motor volume from maximum to zero, and to control said members in reverse sequence, including a volume control shaft, a pair of crank arms loosely mounted on said shaft connected one to each pump volume control member, a second pair of crank arms loosely mounted on said shaft connected one to each motor volume control member, means for yieldingly connecting said crank arms to said shaft and means for limiting the movements of each pair of said arms in response to rotation of said shaft, and a steering control mechanism connected to said pump control members to vary the relative volumes of said pump units.

2. A control system for track type drives employing a separate transmission for each track, each transmission including variable volume hydraulic pump and motor units and a separate volume control member associated with each pump unit and each motor unit, comprising in combination, a volume control shaft, a pump volume control arm loosely mounted on said shaft connected to each of said pump volume control members, a motor volume control arm loosely mounted on said shaft connected to each of said motor volume control members, means resiliently connecting said arms to said shaft, and means limiting the rotative movements of said arms by said shaft to provide for sequential operation of said arms by said shaft, whereby rotation of said shaft in one direction first moves said pump volume control members and then said motor volume control members, while rotation in the other direction moves said control members in reverse sequence.

3. A control system including a control shaft, separate control members, means for sequentially operating said members upon rotation of said shaft including a crank arm loosely mounted on said shaft and connected to one of said control members, a second crank arm loosely mounted on said shaft and connected to the other of said control members, a yieldable connection between each crank arm and said shaft for moving said crank arms upon rotation of said shaft, and means for causing sequential movement of said crank arms by said shaft including an interlocking member arranged to engage one or the other of said crank arms and hold it against movement while allowing the other to be driven by said control shaft.

4. A control system including a control shaft, separate control members, means for sequentially operating said members upon rotation of said shaft including a crank arm loosely mounted on said shaft and connected to one of said control members, a second crank arm loosely mounted on said shaft and connected to the other of said control members, a yieldable connection between each crank arm and said shaft for moving said crank arms upon rotation of said shaft, means for causing sequential movement of said crank arms by said shaft including a stationary interlocking member arranged to engage one or the other of said crank arms and hold it against movement while allowing the other to be driven by said control shaft, and means whereby said member is so controlled that operation of said interlocking shaft in one direction first actuates said first crank arm and then said second crank arm.

5. The combination in a control system for separate mechanisms requiring operation in sequence, comprising a control shaft, a relatively movable crank arm supported on said shaft and connected to one of said mechanisms, a second relatively movable crank arm supported on said shaft and connected to the other of said mechanisms, means associated with each arm adapted to yieldingly connect it to said shaft for movement therewith, and means for selectively engaging said arms to permit movement of one arm only at a given time, including a detent member engageable with cooperating recesses in each crank arm, means for biasing said detent toward one crank arm whereby when said crank arm is rotated by said shaft sufficiently to engage said detent in the associated recess said arm is held against further movement in that direction, and said other arm is released for movement with said shaft.

6. The combination in a control system for separate mechanisms requiring operation in sequence, comprising a control shaft, a relatively movable crank arm supported on said shaft and connected to one of said mechanisms, a second relatively movable crank arm supported on said shaft and connected to the other of said mechanisms, means adapted to yieldingly connect said crank arms to said shaft for movement therewith including a spring pressed detent on each arm adapted to engage an associated recess movable with said shaft, and means for selectively engaging said arms to permit movement of one arm only at a given time including a slidably mounted detent rod having a detent tooth at each end engageable in one other of two cooperating recesses formed in said crank arms and circumferentially offset from each other, and means biasing said rod toward one of said crank arms, each detent tooth on said rod being so formed as to limit movement of the associated arm in one direction and to permit movement in the other direction under the impulse of the associated spring pressed detent.

7. In a control system for a power transmission of the type including a variable volume positive displacement pump having a volume control device, and a variable volume positive displacement hydraulic motor having a volume control device, a hydraulic circuit between said pump and motor, together with driving means for said pump and means driven by said motor, the combination of a member common to said pump and motor volume control devices and connections from said common member to the volume control devices of the pump and motor, respectively, for first moving the volume control device of the pump without moving the volume control device of the motor and for then sequentially moving the volume control device of the motor without moving the volume control device of the pump.

8. In a control system for a power transmission of the type including a variable volume positive displacement pump having a volume control device, and a variable volume positive displacement hydraulic motor having a volume control device, a hydraulic circuit between said pump and motor, together with driving means for said pump and means driven by said motor, the combination of a member common to said pump and motor volume control devices and connections from said common member to the volume control devices of the pump and motor, respectively, for first moving the volume control device of the pump from zero to maximum volume position without moving the volume control device of the motor and for then moving the volume control device of the motor from maximum toward zero volume position without moving the volume control device of the pump.

9. In a control system for a power transmission of the type including a variable volume positive displacement pump having a volume control device, and a variable volume positive displacement hydraulic motor having a volume control device, a hydraulic circuit between said pump and motor, together with driving means for said pump and means driven by said motor, the combination of a member common to said pump and motor volume control devices and connections from said common member to the volume control devices of the pump and motor respectively, for first moving the volume control device of the pump from zero to maximum position while the volume control device of the motor is locked against movement and for then moving the volume control device of the motor from maximum toward zero position while the volume control device of the pump is locked against movement.

10. In a control system in accordance with claim 7, the combination of a secondary control mechanism independent of said common member for independently varying the position of the volume control device of the pump.

11. In a power transmission of the hydro-mechanical type, a planetary gearing comprising a sun gear, a gear concentric therewith, at least one planetary gear meshing with said sun gear and with said concentric gear, and a carrier for said planetary gear, in combination with a hydraulic transmission comprising a variable volume positive displacement pump unit having a volume control device and a variable volume positive displacement hydraulic motor unit having a volume control device, and a hydraulic circuit connecting said units, one of said units being rotatably connected with said planetary carrier and the other unit being rotatably connected with said concentric gear, together with control means for said transmission comprising means for moving one of said volume control devices without moving the other volume control device.

12. In a power transmission of the hydro-mechanical type, a planetary gearing comprising a sun gear, a gear concentric therewith, at least one planetary gear meshing with said sun gear and with said concentric gear, and a carrier for said planetary gear, in combination with a hydraulic transmission comprising a variable volume positive displacement pump unit having a volume control device and a variable volume positive displacement hydraulic motor unit having a volume control device, and a hydraulic circuit connecting said units, one of said units being rotatably connected with said planetary carrier and the other unit being rotatably connected with said concentric gear, together with control means for said transmission comprising means for first moving one of said volume control devices from zero to maximum volume position without moving the other volume control device and then moving the second volume control device without moving the first volume control device.

13. In a power transmission in accordance with claim 11, the combination of a secondary control mechanism for independently varying the position of the volume control device for the pump.

14. In a power drive for a vehicle having two ground engaging members, two power transmissions of the hydro-mechanical type, each comprising a planetary gearing comprising a driven sun gear, a gear concentric therewith, at least one planetary gear meshing therewith and also meshing with said concentric gear, connections from each said concentric gear for driving its respective ground engaging member, and a carrier for said planetary gear, in combination with a hydraulic transmission for each said planetary gearing, each comprising a variable volume positive displacement pump unit having a volume control device and a variable volume positive displacement hydraulic motor unit having a volume control device, and a hydraulic circuit connecting said associated units, respectively, each said pump unit rotatably connected with its respective planetary carrier and each said motor unit being rotatably connected with its respective concentric gear, together with control means for said transmissions, comprising means for moving the volume control devices of the pumps without moving the volume control devices of the motors.

15. In a power drive in accordance with claim 14, the combination of a secondary control mechanism for independently varying the position of the volume control device for the two pumps inversely.

16. In a power drive for a vehicle having two ground engaging members, two power transmissions of the hydro-mechanical type, each comprising a planetary gearing and a hydraulic transmission, said planetary gearing comprising a driven sun gear, a gear concentric therewith, at least one planetary gear meshing therewith and also meshing with said concentric gear connections from each said concentric gear for driving its respective ground engaging member, and a carrier for said planetary gear, and said hydraulic transmissions each comprising a variable volume positive displacement pump unit having a volume control device and a variable volume positive displacement hydraulic motor unit having a volume control device, and a hydraulic circuit connecting said units, each said pump unit being rotatably connected with its respective planetary carrier and each said motor unit being rotatably connected with its respective concentric gear, together with control means for said transmissions, comprising common means arranged for moving the volume control devices of the pumps correspondingly without moving the volume control devices of the motors and then moving the volume control devices of the motors correspondingly without moving the volume control devices of the pumps.

17. In a power drive in accordance with claim 16, the combination of a secondary control device independent of said common means arranged for independently moving the volume control devices of said pumps inversely.

18. In a power drive for a vehicle having two ground engaging members, two power transmissions of the hydro-mechanical type, each comprising a planetary gearing and a hydraulic transmission, said planetary gearing comprising a driven sun gear, a gear concentric therewith, at least one planetary gear meshing therewith and also meshing with said concentric gear connections from each said concentric gear for driving its respective ground engaging member, and a carrier for said planetary gear, and said hydraulic transmission comprising a variable volume positive displacement pump unit having a volume control device and a positive displacement hydraulic motor unit and a hydraulic circuit connecting said associated units, each said pump unit being rotatably connected with its respective planetary carrier and each said motor unit being rotatably conected with its respective concentric gear, together with control means for said transmission, comprising common means arranged for moving the volume control devices of the two pumps correspondingly, and a secondary control device arranged for independently moving the volume control devices of said pumps inversely.

ELIAS ORSHANSKY, Jr.
TILDEN W. SOUTHACK.
BENJAMIN KAHN.

REFERENCES CITED

The following references are of record in the file of this patent:

UNITED STATES PATENTS

| Number | Name | Date |
|---|---|---|
| 580,929 | Colgate | Apr. 20, 1897 |
| 1,307,819 | Janney | June 24, 1919 |
| 1,490,799 | Caute | Apr. 15, 1924 |
| 1,590,226 | Boisset | June 29, 1926 |
| 1,660,700 | Anderson | Feb. 28, 1928 |
| 2,173,856 | Orshansky | Sept. 26, 1939 |
| 2,219,984 | Fersing | Oct. 29, 1940 |
| 2,264,444 | Ljungstrom | Dec. 2, 1941 |

FOREIGN PATENTS

| Number | Country | Date |
|---|---|---|
| 212,693 | Great Britain | Mar. 20, 1924 |